US010649915B1

(12) United States Patent
Bielski et al.

(10) Patent No.: US 10,649,915 B1
(45) Date of Patent: May 12, 2020

(54) DISAGGREGATED COMPUTING ARCHITECTURE USING DEVICE PASS-THROUGH WHEREIN INDEPENDENT PHYSICAL ADDRESS SPACES BETWEEN SYSTEMS NODES ARE IMPLEMENTED IN A SINGLE EXECUTION ENVIRONMENT

(71) Applicant: VIRTUAL OPEN SYSTEMS, Grenoble (FR)

(72) Inventors: Maciej Bielski, Grenoble (FR); Alvise Rigo, Grenoble (FR); Michele Paolino, Grenoble (FR); Salvatore Daniele Raho, Grenoble (FR)

(73) Assignee: VIRTUAL OPEN SYSTEMS, Grenoble (FR)

( * ) Notice: Subject to any disclaimer, the term of this patent is extended or adjusted under 35 U.S.C. 154(b) by 0 days.

(21) Appl. No.: 16/172,805

(22) Filed: Oct. 28, 2018

(51) Int. Cl.
*G06F 12/109* (2016.01)
*G06F 9/455* (2018.01)
*G06F 9/4401* (2018.01)
*H04L 12/46* (2006.01)

(52) U.S. Cl.
CPC .......... *G06F 12/109* (2013.01); *G06F 9/4411* (2013.01); *G06F 9/45558* (2013.01); *H04L 12/46* (2013.01); *G06F 2009/45562* (2013.01); *G06F 2009/45579* (2013.01); *G06F 2009/45583* (2013.01)

(58) Field of Classification Search
CPC ................................................... G06F 12/109
See application file for complete search history.

(56) References Cited

U.S. PATENT DOCUMENTS

| 5,491,827 | A | * | 2/1996 | Holtey | G06Q 20/341 |
| | | | | | 711/163 |
| 10,069,749 | B1 | * | 9/2018 | Narkier | G06F 9/5011 |
| 2012/0030676 | A1 | * | 2/2012 | Smith | G06F 21/53 |
| | | | | | 718/1 |

* cited by examiner

*Primary Examiner* — Tammara R Peyton
(74) *Attorney, Agent, or Firm* — Moreno IP Law LLC (57) ABSTRACT

The present disclosure relates to a disaggregated computing architecture comprising: a first compute node (302) comprising an interconnect interface (310); an accelerator node (304) comprising a physical device (402); and an interconnection network (308) linking the first compute node (302) and the accelerator node (304), wherein: the first compute node (302) executes a host operating system (410) and instantiates a first virtual machine (VM) executing a guest device driver (406) for driving the physical device; one or more input registers of the physical device are accessible via a first uniform physical address range (upa_a_devctl) of the interconnection network (308); and the interconnect interface (310) of the first compute node (302) is configured to map a host physical address range (hpa_c_devctl) of the host operating system (410) to the first uniform physical address range (upa_a_devctl).

15 Claims, 9 Drawing Sheets

DISAGGREGATED COMPUTING ARCHITECTURE USING DEVICE PASS-THROUGH WHEREIN INDEPENDENT PHYSICAL ADDRESS SPACES BETWEEN SYSTEMS NODES ARE IMPLEMENTED IN A SINGLE EXECUTION ENVIRONMENT

CROSS-REFERENCE TO RELATED APPLICATION

Field

The present disclosure relates generally to the field of computing systems, and in particular to a disaggregated computer architecture.

Background

In the field of computing, virtualization permits an improved use of hardware resources by permitting more than one operating system to share computing hardware, known in the field as a compute system. In particular, a compute system is a combination of hardware resources, including one or more processing devices, memory and networking circuits, as well as a software module known as a hypervisor. The hypervisor is used to support a plurality of virtual machines, each for example being associated with a different operating system. A compute system provides an execution environment in which more than one virtual machine may be executed.

It may be desirable to make certain hardware devices accessible to the virtual machines of a compute system to improve performance. For example, accelerators configured for certain tasks, such as GPUs (Graphic Processing Units), cryptographic circuits, augmented reality or image processing accelerators in the context of edge computing, or other devices, may significantly improve the processing times for certain types of tasks, enable new computing paradigms, and/or permit the attachment of a remote device that would not otherwise be possible. One technique for allowing virtual machines to access such hardware devices is to provide a software emulation of the device. However, such an approach tends to be slow.

Device pass-through provides a better solution. According to this approach, the host operating system (hypervisor) driver performs mapping of the physical address space associated with the device registers in the host system to a physical address space associated with a virtual machine, such that a driver implemented by the virtual machine can directly access, within its visible address ranges, the registers of the hardware device without further host mediation. This permits a virtual machine to use the hardware device with near native performance.

Architecture disaggregation is another trend that permits an improved use of hardware resources. In a disaggregated architecture, a computing system is formed of interconnected but independent system nodes, each system node generally providing one of processing resources (CPUs), memory, and acceleration. The system nodes are interconnected via a reconfigurable interconnection network. Disaggregated architectures are for example particular beneficial where high amounts of data processing is required, such as in data centers, smart cities, connected vehicles or the like, and more generally in situations in which the computing power of new generation algorithms, e.g. artificial intelligence, benefits from access to distributed disaggregated computing elements.

Thus, whereas in a traditional machine architecture the processors, memory banks and available hardware devices are accessible through the same physical address space, in a disaggregated architecture, each system node has its own independent physical address space.

It would be desirable to allow one or more virtual machines implemented at one or more system nodes of a disaggregated architecture to be able to access an accelerator implemented at another system node. Indeed, this would permit an efficient use of such an accelerator by several virtual machines.

However, there are technical difficulties in implementing device pass-through in a disaggregated system. There is thus a need in the art for a device and method for driving, using a virtual machine, a physical device of an accelerator node in a disaggregated computer architecture.

SUMMARY

Embodiments of the present disclosure address one or more needs in the prior art.

According to one embodiment, there is provided a disaggregated computing architecture comprising: a first compute node comprising an interconnect interface; an accelerator node comprising a physical device; and an interconnection network linking the first compute node and the accelerator node, wherein: the first compute node executes a host operating system and instantiates a first virtual machine executing a guest device driver for driving the physical device;

one or more input registers of the physical device are accessible via a first uniform physical address range of the interconnection network; and the interconnect interface of the first compute node is configured to map a host physical address range of the host operating system to the first uniform physical address range.

According to one embodiment, the disaggregated computing architecture further comprises a first memory node, wherein the accelerator node further comprises a memory management unit configured to map addresses in a guest physical address range of the first virtual machine to a second uniform physical address range for accessing an address range in the first memory node associated with the first virtual machine.

According to one embodiment, the memory management unit is configurable via a third uniform physical address range of the interconnection network.

According to one embodiment, the disaggregated computing architecture further comprises a global system orchestrator coupled, via a further network, to the interconnect interface of the first compute node and to an interconnect interface of the accelerator node.

According to one embodiment, the disaggregated computing architecture further comprises a second compute node comprising an interconnect interface, wherein: the second compute node executes a host operating system and instantiates a second virtual machine executing a second guest device driver for driving the physical device; and the interconnect interface of the second compute node is configured to map a host physical address range of the host operating system of the second compute node to the first uniform physical address range.

According to one embodiment, the disaggregated computing architecture further comprises a second memory node, wherein the memory management unit is further configured to map addresses in a guest physical address range of the second virtual machine to a third uniform physical address range for accessing an address range in the second memory node associated with the second virtual machine.

According to one embodiment, the accelerator node is a circuit of an electrical vehicle, and the first compute node is part of a data center unit of a vehicle charging station.

According to a further aspect, there is provided a compute node of a disaggregated computing architecture, the compute node comprising an interconnect interface, wherein: the compute node executes a host operating system and instantiates a first virtual machine executing a guest device driver for driving a physical device of a disaggregated accelerator node; one or more input registers of the physical device are accessible via a first uniform physical address range of an interconnection network linking the compute node and the disaggregated accelerator node; and the interconnect interface of the compute node is configured to map a host physical address range of the host operating system to the first uniform physical address range.

According to a further aspect, there is provided an accelerator node of a disaggregated computing architecture, the accelerator node comprising: a physical device; and one or more input registers of the physical device accessible via a first uniform physical address range of an interconnection network linking the accelerator node to a compute node.

According to one embodiment, the accelerator node further comprises a memory management unit configured to map addresses in a guest physical address range of a first virtual machine instantiated in the compute node to a second uniform physical address range for accessing an address range in a first memory node associated with the first virtual machine.

According to one embodiment, the memory management unit is configurable via a third uniform physical address range of the interconnection network.

According to a further aspect, there is provided a system orchestrator for a disaggregated computing architecture, the disaggregated computing architecture comprising at least a first compute node and at least a first accelerator node interconnected by a reconfigurable interconnection network, the system orchestrator comprising one or more circuits that are configured to: receive a request from a first virtual machine of the first compute node for device pass-through to a physical device of the first accelerator node; and configure interconnect interfaces of the compute node and of the accelerator node to permit translation from a host physical address range of the first compute node to a host physical address range of the first accelerator node.

According to one embodiment, the one or more circuits are configured to: configure the interconnect interface of the compute node to map a first host physical address range of the first compute node to a first uniform physical address range for use of the reconfigurable interconnection network; and configure the interconnect interface of the accelerator node to map the first uniform physical address range to a second host physical address range of the first accelerator node.

According to one embodiment, the one or more circuits are further configured to: configure a memory management unit of the accelerator node to map virtual physical addresses of the first virtual machine to uniform physical addresses for use over the reconfigurable interconnection network.

According to a further aspect, there is provided a method of driving a physical device of an accelerator node in a disaggregated computing architecture using device pass-through, the method comprising: executing, by a first compute node of the disaggregated computing architecture, a host operating system, the first compute node instantiating a first virtual machine executing a guest device driver for driving the physical device; accessing, by the guest device driver, one or more input registers of the physical device via a guest physical address range of first virtual machine; mapping, by a pass-through driver of the host operating system, the guest physical address range to a host physical address range of the host operating system; and mapping, by an interconnect interface of the first compute node, the host physical address arrange to a first uniform physical address range of the interconnection network for addressing the accelerator node.

According to one embodiment, accessing the one or more input registers of the physical device comprises storing to the one or more input registers one or more pointers to an address range in a memory node associated with the first virtual machine.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF THE PRESENT EMBODIMENTS

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail. For example, virtualization techniques for instantiating virtual machines, and handling their operation via a hypervisor, are well known in the art and will not be described in detail. For example, such techniques are described in more detail in the international patent applications published as WO2016/150847 and WO2016/174046 in the name of the present applicant, the content of these applications being incorporated herein by reference.

Unless indicated otherwise, when reference is made to two elements connected together, this signifies a direct connection without any intermediate elements other than conductors, and when reference is made to two elements linked or coupled together, this signifies that these two elements can be connected or they can be linked or coupled via one or more other elements.

Unless specified otherwise, the expressions "around", "approximately", "substantially" and "in the order of" signify within 10%, and preferably within 5%.

Throughout the present disclosure, the following terms are considered to have meanings as follows:
"disaggregated computing system" or "disaggregated computing architecture": a computing system forming a single execution environment formed of separate system nodes interconnected by a network, such as a high-speed network, wherein each system node has an independent physical address space;
"system node": a node of a disaggregated computing system providing one or more (and generally only one) of processing resources, memory and hardware acceleration for implementing the execution environment of the computing system;
"global system orchestrator"—one or more devices for configuring and managing communications links between the system nodes of a disaggregated computing system, the global system orchestrator being implemented in hardware, and/or by software executed for example by one or more of the compute nodes and memory nodes of the disaggregated architecture;
"hardware accelerator" or "physical device"—one or more circuits, usually with associated drivers, configured for implementing a given function that will in general be performed much faster than the software-implemented execution of the function; and
"physical address space" or "physical address range"— base addresses conventionally used by CPUs to access memory or device registers available on a given platform. In the case of a standard computing system, these addresses may correspond to the actual addresses of physical address locations in one or more memories of the system, whereas in the case of a disaggregated computing system the physical addresses are those emitted by the CPU and generally do not correspond to the physical address locations in the disaggregated memory.

Figure 1:
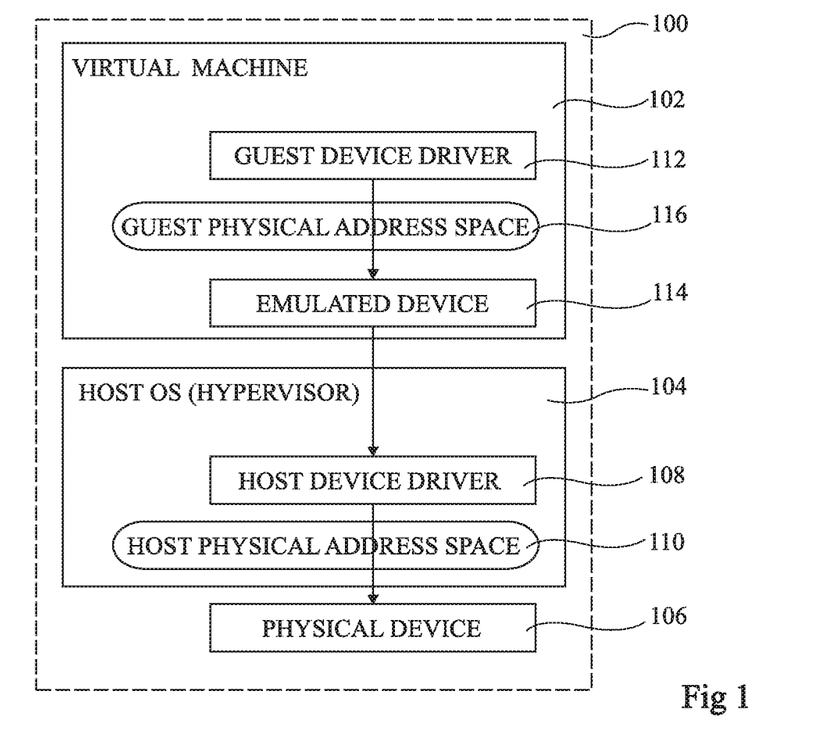
FIG. 1 schematically illustrates a compute system comprising an accelerator device accessible via device emulation according to an example embodiment.

FIG. 1 schematically illustrates a compute system 100 according to an example embodiment. The compute system 100 comprises a virtual machine (VIRTUAL MACHINE) 102 and a host operating system (HOST OS (HYPERVISOR)) 104, which for example comprises a hypervisor for managing virtual machines. The software associated with the virtual machine 102 will be referred to herein as relating to a "guest", as the software does not directly form part of the system software of the compute system 100.

The compute system 100 also comprises a physical device (PHYSICAL DEVICE) 106. While not shown in FIG. 1, the physical device 106 is for example coupled to other hardware elements of the compute system 100 via a PCI bus or the like.

The host operating system 104 for example comprises a host device driver (HOST DEVICE DRIVER) 108, forming part of the system software of the compute system. The host operating system 104 can for example access the physical device 106 via the host physical address space (HOST PHYSICAL ADDRESS SPACE) 110.

In order to permit the guest operating system, executed by a virtual machine and which for example comprises a guest device driver (GUEST DEVICE DRIVER) 112, to make use of the computational power of the physical device 106, the device 106 may be emulated within the virtual machine in software, as represented by a block (EMULATED DEVICE) 114 in FIG. 1. The guest device driver 112 can therefore directly interface with the emulated device 114 via the guest physical address space (GUEST PHYSICAL ADDRESS SPACE) 116.

The emulation solution of FIG. 1 permits a virtual machine running guest software, and in particular using the guest device driver 112, to use the physical device 106 in a manner that is relatively transparent to the virtual machine. However, a drawback of such a solution is that the software emulation of the physical device 106 will generally lead to significant delays in the communication between the virtual machine and the physical device 106, which may be unacceptable in certain circumstances.

Figure 2:
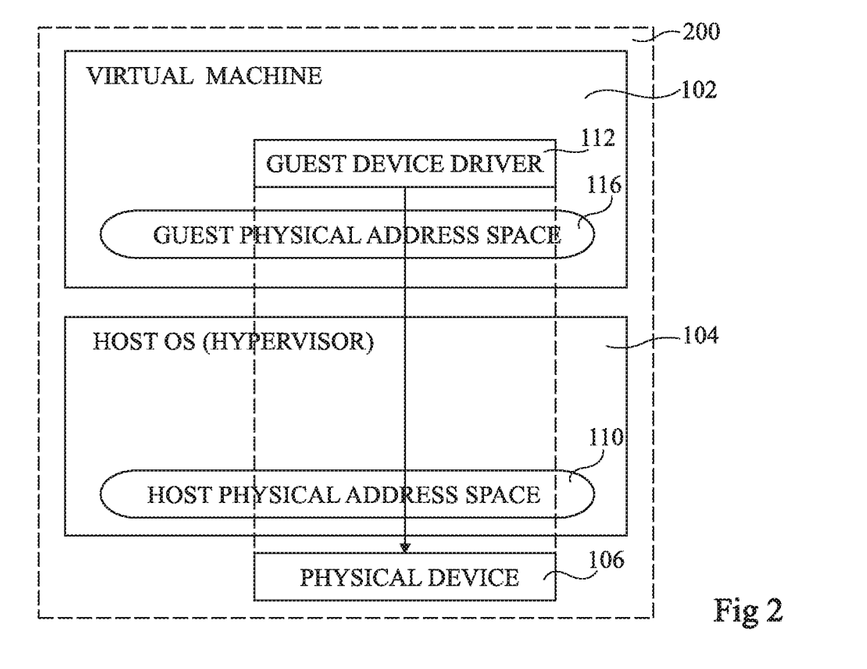
FIG. 2 schematically illustrates a compute system comprising an accelerator device accessible via device pass-through according to an example embodiment.

FIG. 2 schematically illustrates a compute system 200 according to a further example embodiment. Many features of the compute system 200 of FIG. 2 are the same as those of the compute system 100 of FIG. 1, and such features have been labelled with like reference numerals and will not be described again in detail.

In the example of FIG. 2, the physical device 106 is accessed directly by the guest device driver 112 of the virtual machine via the guest physical address space 116 using a device pass-through technique. In particular, according to the device pass-through technique, the host operating system 104 provides address translation between the guest physical address space 116 used by the virtual machine, and the host physical address space 110 used for driving the physical device 106.

The solution of FIG. 2 has relatively low latency, meaning that, with respect to the emulation solution of FIG. 1, the physical device 106 can be used by the virtual machine with near native performance.

Figure 3:
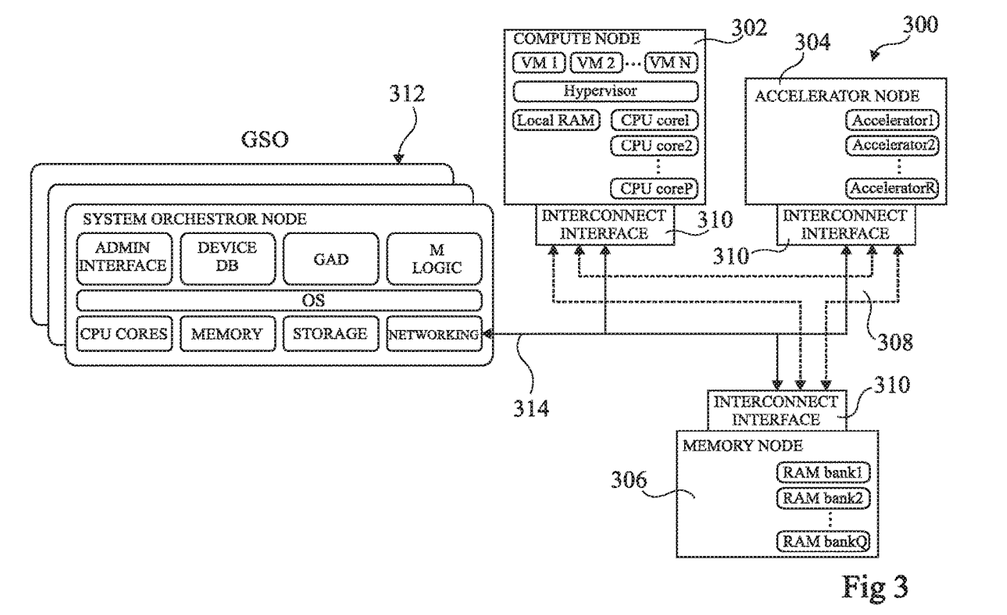
FIG. 3 schematically illustrates a disaggregated computing architecture according to an example embodiment.

FIG. 3 schematically illustrates a disaggregated computing system 300 according to an example embodiment. The system 300 for example comprises system nodes 302, 304 and 306 interconnected by a reconfigurable interconnection network 308. In the example of FIG. 3, the system node 302 is a compute node (COMPUTE NODE), the system node 304 is an accelerator node (ACCELERATOR NODE), and the system node 306 is a memory node (MEMORY NODE).

The compute node 302 for example comprises virtual machines VM 1 to VM N, a hypervisor, local RAM, and CPU cores CPU core1 to CPU coreP.

The accelerator node 304 for example comprises R accelerators Accelerator1 to AcceleratorR.

The memory node 306 for example comprises Q memory banks RAM bank1 to RAM bankQ.

Each of the system nodes 302, 304 and 306 for example comprises a corresponding interconnect interface circuit (INTERCONNECT INTERFACE) 310 for permitting communications with the other system nodes over the interconnection network 308, and also for providing communications with a global system orchestrator (GSO) 312 formed of one or more system orchestrator nodes (SYSTEM ORCHESTRATOR NODE). The GSO 312 is for example responsible for configuring the interconnections between the system nodes via the reconfigurable interconnection network 308, and in particular for managing a uniform physical address (UPA) space for use across the interconnection network 308. For example, a supplementary network 314 is provided for communications between the GSO 312 and each of the system nodes. The network 314 is for example an Ethernet network or the like.

The GSO 312 for example comprises an administrator interface (ADMIN INTERFACE), a device database (DEVICE DB), a global addresses database (GAD), management logic (M LOGIC), an operating system (OS), CPU cores (CPU CORES), volatile memory (MEMORY), persistent or non-volatile storage (STORAGE) and a networking interface (NETWORKING), the latter being coupled to the network 314 for communicating with the interconnect interfaces 310 of each of the system nodes.

It would be desirable that a mechanism is provided allowing the virtual machines VM 1 to VM N of the compute node 302 to make use of the accelerators of the accelerator node 304 in such a disaggregated computing system 300. However, there is difficulty in implementing such a function, as will now be described in more detail with reference to FIG. 4.

Figure 4:
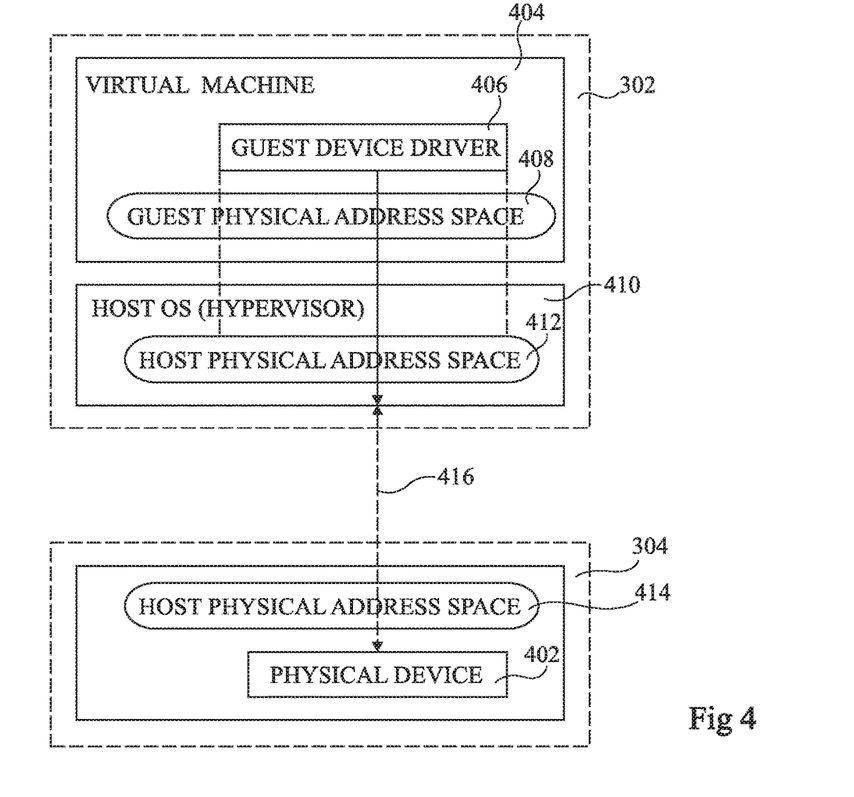
FIG. 4 schematically illustrates a processing system node and a disaggregated system node of a disaggregated computing architecture according to an example embodiment.

FIG. 4 schematically illustrates part of the compute node 302 and part of the accelerator node 304 of the disaggregated computing system 300 in more detail according to an example embodiment.

One of the accelerators corresponds to a physical device (PHYSICAL DEVICE) 402, with which a virtual machine (VIRTUAL MACHINE) 404 of the compute node 302 wishes to communicate. A guest device driver (GUEST DEVICE DRIVER) 406 of the virtual machine 404 for example uses a guest physical address space (GUEST PHYSICAL ADDRESS SPACE) 408, and a host operating system (HOST OS (HYPERVISOR)) 410 may provide a mapping from this guest physical address space to a host physical address space (HOST PHYSICAL ADDRESS SPACE) 412 of the host OS 410 of the compute node 302.

However, the accelerator node 304 uses a further host physical address space (HOST PHYSICAL ADDRESS SPACE) 414, which is not the same as the host physical address space 412 of the host operating system 410 of the compute node 302. Thus, while the physical device 402 may be addressed using the host physical address space 414 of the accelerator node 304, there is no relation or connectivity between the host physical address spaces 412 and 414, preventing the communication represented by the dashed arrow 416 in FIG. 4 between the compute node 302 and the accelerator node 304. A solution for overcoming this difficulty will now be described in more detail with reference to FIG. 5.

Figure 5:
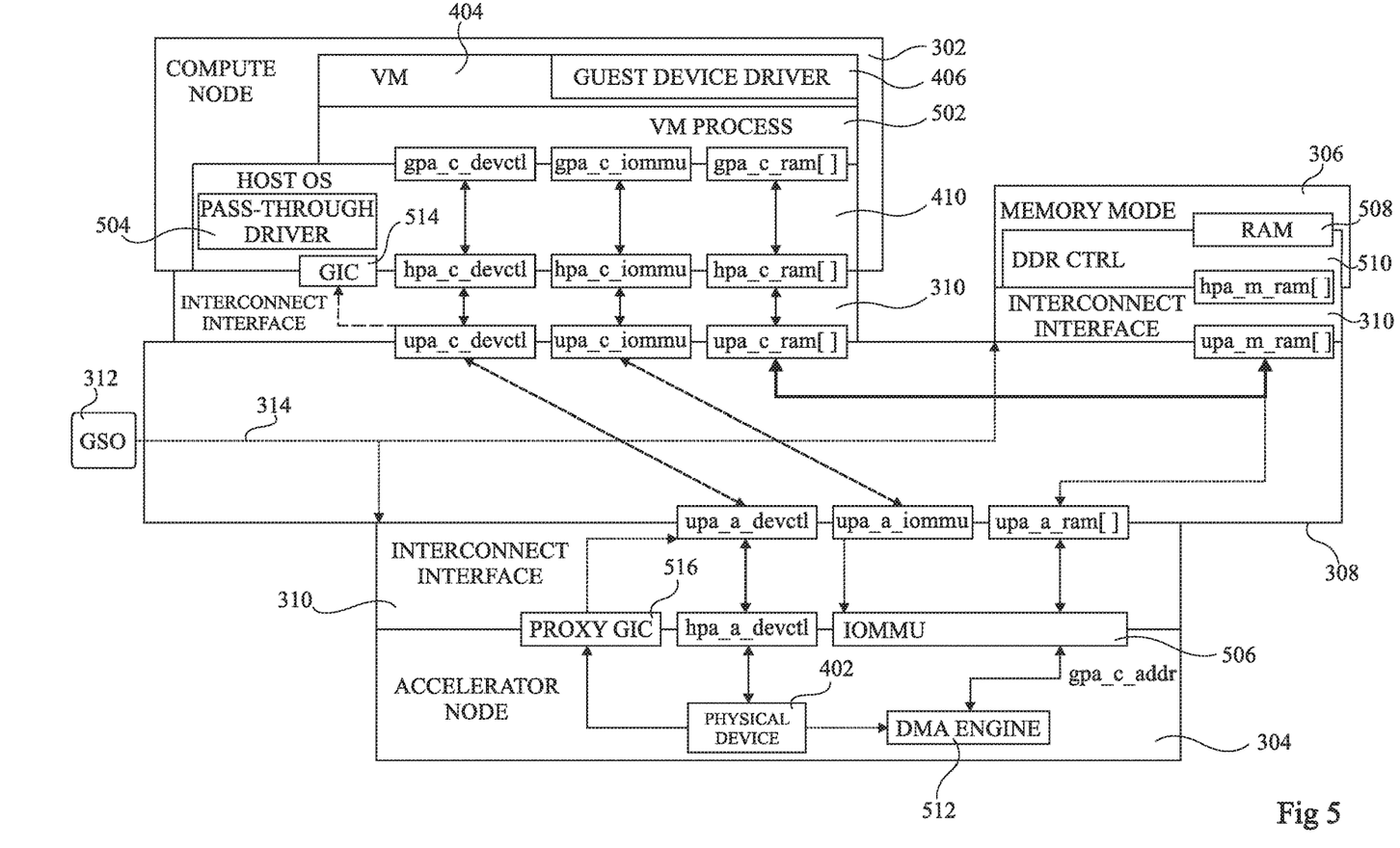
FIG. 5 schematically illustrates a disaggregated computing architecture according to an example embodiment of the present disclosure.

FIG. 5 schematically illustrates a disaggregated computing architecture according to an example embodiment of the present disclosure. Certain features of FIG. 5 are similar to features of FIGS. 3 and 4, and these features have been labelled with like reference numerals and will not be described again in detail. For example, the architecture of FIG. 5 comprises the compute node 302, the accelerator node 304, the memory node 306 and the GSO 312, which each for example comprise similar elements (not illustrated again in FIG. 5) to those of FIG. 3.

In the following description, physical address ranges are identified using the format xpa_y_z, where:
  x indicates the address space type, which is for example a guest physical address space denoted by the letter "g", a host physical address space denoted by the letter "h", or a uniform physical address space denoted by the letter "u";
  y indicates the system node corresponding to the address space, which is for example the compute node denoted by the letter "c", the memory node denoted by the letter "m", or the accelerator node denoted by the letter "a"; and
  z indicates the usage of the address space, where "devctl" designates control registers of the physical device being targeted, "iommu" indicates the IOMMU of the accelerator node (described in more detail below), and "ram" indicates memory of the memory node 306 allocated for use by a given virtual machine.

Each physical address range for example corresponds to a single contiguous address range, although in alternative embodiments, it may comprise a plurality of sub-ranges that are not contiguous with respect to each other.

As illustrated in FIG. 5, within the compute node 302, the virtual machine 404 executes the guest device driver 406 in relation with a virtual machine process (VM PROCESS) 502. The guest device driver 406 for example performs address translation from the guest virtual address space (GVA) to the guest physical address space (GPA), corresponding to the physical address space attributed to the virtual machine 404.

The virtual machine process 502 executed by the virtual machine 404 is for example capable of addressing control registers of the physical device 402 of the accelerator node 304 using an address range gpa_c_devctl of its guest physical address space. The virtual machine process function 502 also for example accesses an address range of the memory node 306 using an address range from an array gpa_c_ram[ ] of address ranges of its guest physical address space.

The host operating system 410 for example comprises a pass-through driver (PASS-THROUGH DRIVER) 504, which provides a mapping from the guest physical address space of the guest device driver 406 to the host physical address space of the host operating system 410. In particular, the pass-through driver 504 for example provides a mapping between the physical address range gpa_c_devctl and a corresponding physical address range hpa_c_devctl of the host OS, and a mapping between the array of address ranges gpa_c_ram[ ] and a corresponding array of address ranges hpa_c_ram[ ] of the host OS.

The interconnect interface 310 is in turn configured to provide a mapping from the host physical address space of the host OS 410 to a uniform physical address (UPA) space employed on the interconnection network 308. The UPA space corresponds to an address space managed by the global system orchestrator (GSO) 312 that permits communications between the interconnect interfaces 310 of the various system nodes. Indeed, the GSO 312 governs which address ranges of the UPA space are attributed to which physical address spaces of the various system nodes.

The interconnect interface 310 of the compute node 302 for example provides a mapping between the host physical address range hpa_c_devctl and a corresponding uniform physical address range upa_c_devctl, and a mapping between the array of host physical address ranges hpa_c_ram[ ] and a corresponding array of uniform physical address ranges upa_c_ram[ ].

Furthermore, in order to permit configuration of an input/output memory management unit (IOMMU) 506 of the accelerator node 304, the interconnect interface 310 also for example provides a mapping between a host physical address range hpa_c_iommu and a corresponding uniform physical address range upa_c_iommu via which the IOMMU can be configured. In particular, as will be described in more detail below, the pass-through driver 504 is for example capable of using the address range hpa_c_iommu to address one or more control registers of the IOMMU 506.

The memory node 306 for example comprises a memory storage portion (RAM) 508, which is for example a random access memory, or other type of programmable volatile or non-volatile memory, and a DDR control circuit (DDR CTRL) 510. The interconnect interface 310 of the memory node 306 for example provides a mapping between the array of uniform physical address ranges upa_m_ram[ ] and a corresponding array of host physical address ranges hpa_m_ram[ ] of the memory node 306.

The accelerator node 304 comprises the physical device 402 and a DMA engine (DMA ENGINE) 512. The interconnect interface 310 of the accelerator node 304 for example provides a mapping between the uniform physical address range upa_a_devctl and a corresponding host physical address range hpa_a_devctl of the accelerator node 304. It also provides a mapping between the uniform physical address range upa_a_iommu and corresponding registers of the IOMMU 506.

The DMA engine 512 for example supplies the output data generated by the physical device 402 to the memory node 306 via the interconnect interface 310. For example, the DMA engine 512 generates write addresses gpa_c_addr in the guest physical address space GPA of the VM process 502. The IOMMU 506 for example provides a mapping of the addresses gpa_c_addr into a uniform physical addresses upa_a_addr in the uniform physical address space, and in particular in a uniform address range of the array upa_a_ram[ ] corresponding to the address space in the memory node 306 attributed to the virtual machine 404.

The physical device 402 also generates interrupts in order to signal various events to the software. Interrupts directed to virtual machines of the compute node 302 are for example handled by a global interrupt controller (GIC) 514 at the compute node 302. The GIC 514 can be configured by the host OS 410 in order to receive, mute, merge interrupts, etc., before they are passed to the host OS 410. Interrupt handling in a virtual context is for example described in more detail in the European patent application published as EP3255544, the contents of which are hereby incorporated by reference. In view of the disaggregation, the GIC 514 is not located at the same node as the physical device 402. Therefore, interrupts emitted by the accelerator node 304 are passed to a proxy GIC (PROXY GIC) 516 within the accelerator node 304. The proxy GIC 516 relays these interrupts to the corresponding GIC, such as the GIC 514 of the compute node 302, according to a VM identifier VM_GID of the virtual machine accessing the physical device. In particular, the identifier VM_GID is for example a system-wide unique identifier of a virtual machine assigned by the GSO 312 at the VM creation time.

In operation, the GSO 312 is for example adapted to configure, using the network 314, the interconnect interfaces 310 of each of the system nodes in order to correctly program the mappings between each of the host physical address spaces and the corresponding uniform physical address spaces. For example, the GSO 312 comprises one or more interface circuits that are adapted to receive requests from the virtual machine 404 for device pass-through to be established with the physical device 402 of the accelerator node 304. The GSO 312 is also for example adapted to configure the interconnect interfaces 310 of the compute node 302 and of the accelerator node 304 to permit translation from the host physical address space of the compute node 302 to the host physical address space of the accelerator node 304. This for example involves configuring the interconnect interface 310 of the compute node 302 to map the host physical address range hpa_c_devctl of the compute node to the uniform physical address range upa_c_devctl and configuring the interconnect interface 310 of the accelerator node 304 to map the uniform physical address range upa_a_devctl to the host physical address range hpa_a_devctl of the accelerator node 304.

Furthermore, the GSO 312 is also for example adapted to program, using new connectivity described in more detail below, the address mapping translation provided by the IOMMU 506 to map guest physical addresses gpa_c_addr of the virtual machine 404, generated by the guest device driver 406, to uniform physical addresses upa_a_addr (not illustrated) of the array of address ranges upa_a_ram[ ] for use on the interconnection network 308. This for example allows the accelerator node 304 to write data directly to, and read data directly from, the ranges of the host physical address space of the memory node 306, which for example corresponds to RAM of a given virtual machine 502. The guest physical addresses are for example passed to the IOMMU using an input via the address ranges gpa_c_iommu, hpa_c_iommu and hpa_a_iommu (the latter not being illustrated in FIG. 5).

Figure 6:
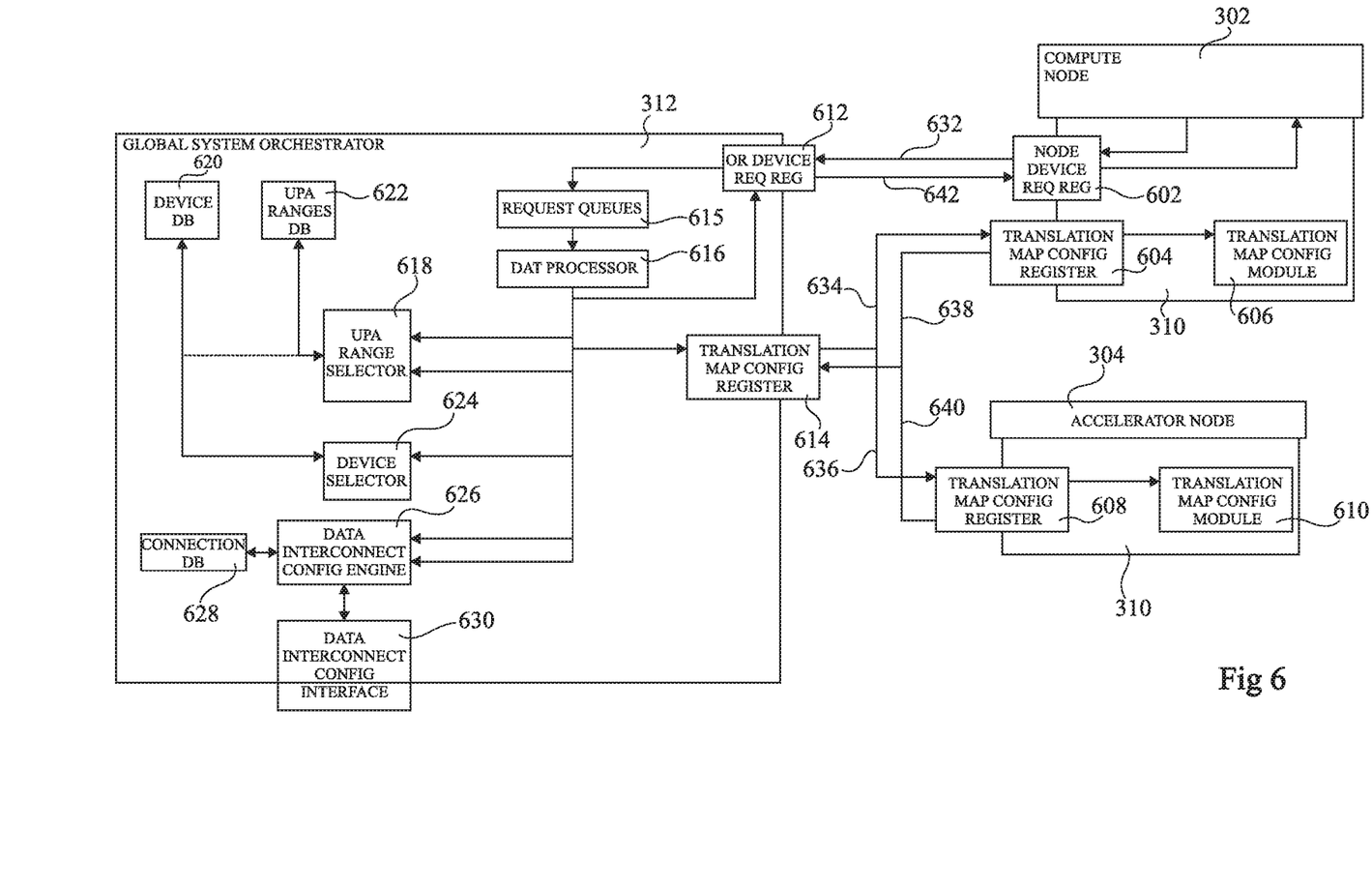
FIG. 6 schematically illustrates elements of the disaggregated commuting architecture of FIG. 5 in more detail according to an example embodiment.

FIG. 6 schematically illustrates the global system orchestrator 312 in more detail, as well as certain parts of the compute node 302 and of the accelerator node 304.

The compute node 302 for example includes a node device request register (NODE DEVICE REQ REG) 602, a translation map configuration register (TRANSLATION MAP CONFIG REGISTER) 604 and a translation map configuration module (TRANSLATION MAP CONFIG MODULE) 606.

The accelerator node 304 for example comprises a translation map configuration register (TRANSLATION MAP CONFIG REGISTER) 608 and a translation map configuration module (TRANSLATION MAP CONFIG MODULE) 610.

The global system orchestrator 312 for example comprises an orchestrator device request register (OR DEVICE REQ REG) 612, a translation map configuration register (TRANSLATION MAP CONFIG REGISTER) 614, blocks/modules 615 storing request queues (REQUEST QUEUES), a device arrangement transaction processor (DAT PROCESSOR) 616, a UPA range selector (UPA RANGE SELECTOR) 618, a device database (DEVICE DB) 620, a UPA ranges database (UPA RANGES DB) 622, a device selector (DEVICE SELECTOR) 624, a data interconnect configuration engine (DATA INTERCONNECT CONFIG ENGINE) 626, a connections database (CONNECTIONS DB) 628 and a data interconnect configuration interface (DATA INTERCONNECT CONFIG INTERFACE) 630. Communications between the various components of FIG. 6 during device attachment, memory space changes and device detachment will now be described in more detail with reference to FIGS. 5 and 6 and also with reference to flow diagrams of FIGS. 7 to 12. In these figures examples are described in relation with the virtual machine 404 of FIG. 5, although the same could be applied to other virtual machines executing on the compute node 302 or on other compute nodes.

Figure 7:
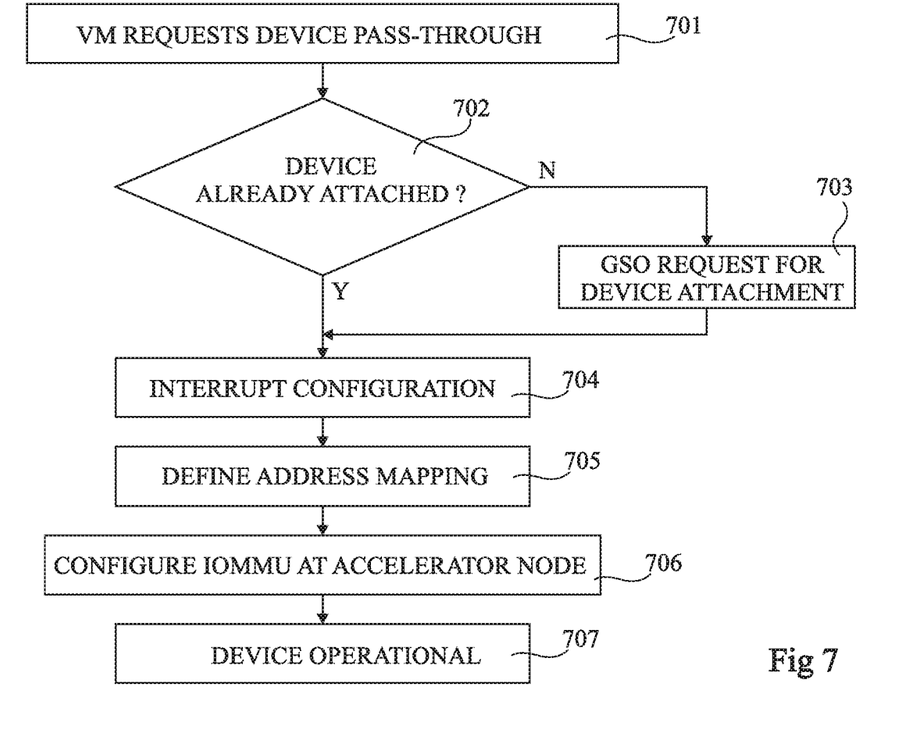
FIG. 7 is a flow diagram representing operations in a method of device initialization for use in pass-through mode according to an example embodiment of the present disclosure.

FIG. 7 is a flow diagram illustrating operations in a method of device attachment according to example embodiment.

In an operation 701 of FIG. 7, when the virtual machine 404 of the compute node 302 wishes to make use of the physical device 402, it for example makes a request to the host OS 410, which is handled by the pass-through driver 504. In some embodiments, the request is made by invoking a system call (SYSCALL).

In an operation 702, it is determined whether the physical device 402 is already attached to the compute node 302. If not, in an operation 703, a request is sent to the global system orchestrator 312 to perform device attachment and obtain a device identifier DEVICE_ID upon completion. The request is for example emitted by the pass-through driver 504 on behalf of the VM 404 or the guest device driver 406. Together with the request, the pass-through driver 504 or guest device driver 406 for example passes one, some or all of the following data elements to the GSO 312:

a. device_type—an identifier of the targeted physical device from a predefined set (for example globally known serial numbers of devices of similar unique identifier for each device model);
  b. VM_GID—a global VM identifier of the virtual machine wishing to access the physical device, this identifier being used to setup the IOMMU mappings properly as well as to identify other resources that will be reserved by the GSO 312;
  c. hpa_c_devctl—the host physical address range allocated and reserved to be linked later with the allotted unique physical address range upa_c_devctl selected by GSO 312;
  d. hpa_c_iommu—the host physical address range allocated and reserved to be linked later with allotted uniform physical address range upa_c_iommu selected by the GSO 312; and
  e. hpa_c_ram[ ]—an array of ranges of the compute node's host physical address space at which the memory of a VM 404 is attached. This allows the GSO 312 to retrieve a corresponding array of ranges upa_c_ram[ ] from the compute node's interconnect interface 310 and subsequently retrieve the array of ranges upa_m_ram[ ] from the connections database 628. The array upa_a_ram[ ] selected later is for example mapped to it in order to allow the device to access the disaggregated RAM of the VM 404.

After operation 703, or after operation 702 if the device is found to already be attached, the device registers become accessible via the host physical address range hpa_c_devctl of the compute node 302, and registers of the IOMMU 506 become accessible via the host physical address range hpa_c_iommu.

In an operation 704, interrupts are for example configured. This for example involves redirecting interrupts to an IRQ register within the address range upa_c_devctl. Furthermore, the host pass-through driver 504 for example reserves a slot for interrupt reception, and configures the GIC 514 to expect it incoming from the IRQ register of upa_c_devctl, and configures the proper interrupt handler executed in the guest OS.

In an operation 705, the address mapping by the host pass-through driver 504 is defined, this driver mapping the guest physical address range gpa_c_devctl to the host physical address range hpa_c_devctl, such that the virtual address space reserved by the virtual machine process 502 for communication with the device is mapped to the host address space.

In an operation 706, the IOMMU 506 receives the guest physical address ranges to be mapped by the GSO 312 (triggered by the pass-through driver 504) at device attachment time, or during a mapping update described in more detail below. The IOMMU 506 then creates translation map entries by mapping all addresses from passed ranges one by one, annotated by VM_GID.

In some embodiments, in order to handle cases in which the guest memory is resized, the guest device driver 406 installs a notification generator that records when guest memory resizes occur, such that all such events that have occurred since the last RAM mapping setup are logged. In this way, before initiating the next device processing, if one or multiple such events took place, a request to the GSO 312 can be made to update the corresponding device side mappings of the guest's allotted physical address space in the memory node 306, as will be described in more detail below.

In operation 707, the device becomes operational, meaning that the guest device driver 406 can now pass, to the accelerator node 304, pointers from the guest physical address space to indicate the presence of input/output data in corresponding input and/or output buffers, together with device operation requests, and the physical device 402 will be capable of directly accessing the guest's disaggregated RAM in the memory node 306, with the aid of the IOMMU 506.

Figure 8:
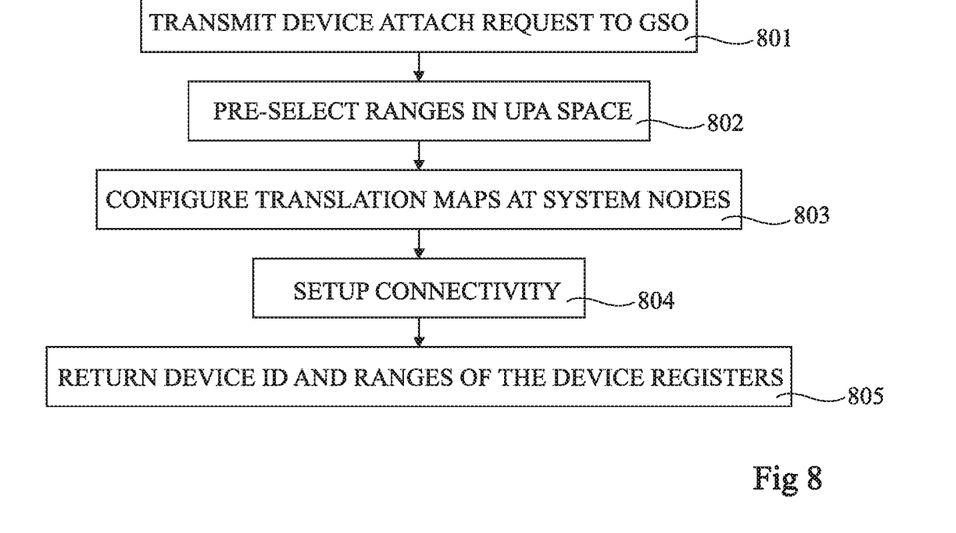
FIG. 8 is a flow diagram representing a device attachment operation of the method of FIG. 7 in more detail according to an example embodiment of the present disclosure.

FIG. 8 is a flow diagram representing in more detail the operation 703 of FIG. 7 and the responsive actions of the global system orchestrator 312.

In an operation 801, a device attachment request is transmitted from the compute node 302 to the global system orchestrator 312, and in particular from the node device request register 602 to the orchestrator device request register 612, as represented by an arrow 632 in FIG. 6.

This request for example comprises some or all of the elements a to e listed above in relation with operation 703 of FIG. 7. The request is for example placed in a queue of the memory 615 corresponding to the device type, before being handled by the DAT processor 616.

In an operation 802, the DAT processor 616 for example pre-selects ranges in the uniform physical address space. In particular, using the UPA range selector 618, UPA ranges are stored in the UPA ranges database 622 in association with the guest global identifier VM_GID of the virtual machine, these ranges including the ranges upa_c_devctl and upa_c_iommu, which are based on the device type, and on the array upa_a_ram[ ] of address ranges, which is based on the amount of guest RAM. This operation may also involve selection of the physical device instance. In some embodiments, the selection of the upa ranges at the device side automatically determines a particular device instance, and thus achieves this selection.

In an operation 803, translation maps are for example configured at the system nodes by the DAT processor 616. This for example involves passing corresponding requests to the interconnect interface 310 of the compute node 302 and of the accelerator node 304 via the translation map configuration registers 614, 604 and 608, as represented by arrows 634 and 636 in FIG. 6. The mappings are configured by the translation map configuration modules 606, 610 of the corresponding nodes 302 and 304, and each then provides a corresponding acknowledgement signal to the register 614, as represented by corresponding arrows 638 and 640 in FIG. 6.

In an operation 804, the connectivity in the interconnection network 308 is then set up by retrieving from the data interconnect configuration engine 626 the array of address ranges upa_m_ram[ ] that the array of address ranges upa_c_ram[ ] is mapped to. The DAT processor 616 may then make a set up connectivity request to the data interconnect configuration engine 626 in order to configure connections between the address ranges upa_c_devctl and upa_a_devctl, between the address ranges upa_c_iommu and upa_a_iommu, and between the arrays of address ranges upa_a_ram[ ] and upa_m_ram[ ].

In an operation 805, the DAT processor 616 returns to the compute node 302, via the registers 612 and 602, confirmation that the device is ready, and provides, as represented by arrow 642, the device identifier DEV_ID attributed to the physical device.

Figure 9:
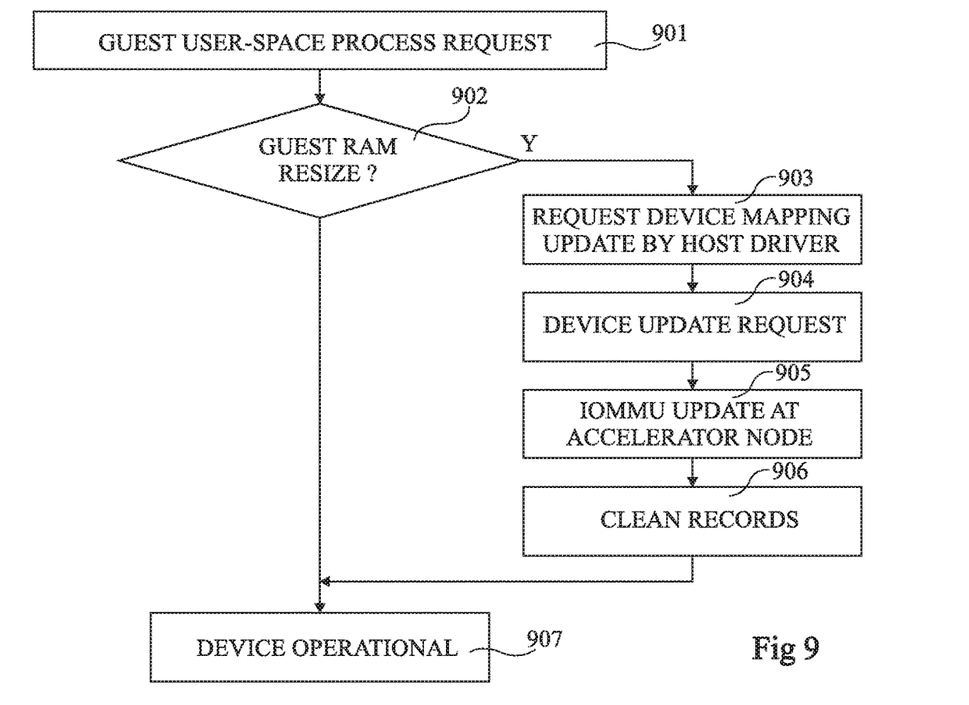
FIG. 9 is a flow diagram representing operations in a method of accessing a physical device using device pass-through in the disaggregated computing architecture of FIG. 5.

FIG. 9 is a flow diagram illustrating operations in a method of using the physical device 402 of the accelerator node 304 by the virtual machine 404.

In an operation 901, when the virtual machine 404 wishes to make use of the disaggregated physical device 402, it for example issues a guest user-space process request to the guest device driver 406, and the guest device driver 406 for example translates virtual addresses of pointers to the input and/or output buffers that are provided as arguments so that they are valid pointers of the guest physical address space.

In an operation 902, it is determined whether or not any guest RAM resize has been recorded since the last RAM mapping setup. For example, as indicated above, the guest device driver 406 monitors when any RAM resizes occurs, and records this information. If it is determined that one or more guest RAM resize events have occurred, operations 903 to 906 are example performed.

In operation 903, a request is made to the pass-through driver 504 to update the device mapping of guest RAM with all recorded changes merged together.

In operation 904, a device update request, together with a recorded list of contiguous guest physical address space ranges, is sent to the GSO 312 by the host pass-through driver 504 to update the disaggregated IOMMU translation map, in order to allow the accelerator 304 to access the whole range of the guest's RAM in disaggregated memory. This request for example comprises some or all of the elements a to e listed above in relation with operation 703 of FIG. 7.

In an operation 905, the IOMMU 506 of the accelerator node 304 receives the guest physical address ranges and updates the translation map by adding new mappings to sub-ranges of the array of address ranges upa_a_ram[ ] one by one, starting from the lowest, or removing existing mappings one by one, starting from highest. All new mappings are for example annotated with the global identifier VM_GID of the virtual machine 404 such that they can be attributed to this virtual machine.

In an operation 906, the records of the guest RAM resize events previously recorded by the guest device driver are for example cleaned.

After operation 906, or after operation 902 if it is determined that no guest RAM resize events have occurred, the next operation is 907, in which the physical device is now considered operational, similarly to operation 707 described above.

The device update request operation 904 of FIG. 9 will now be described in more detail with reference to FIG. 10 in the case that one or more address ranges have been added to the guest memory. The case that one or more address ranges have been removed from the guest memory will be described later in relation with FIG. 12.

Figure 10:
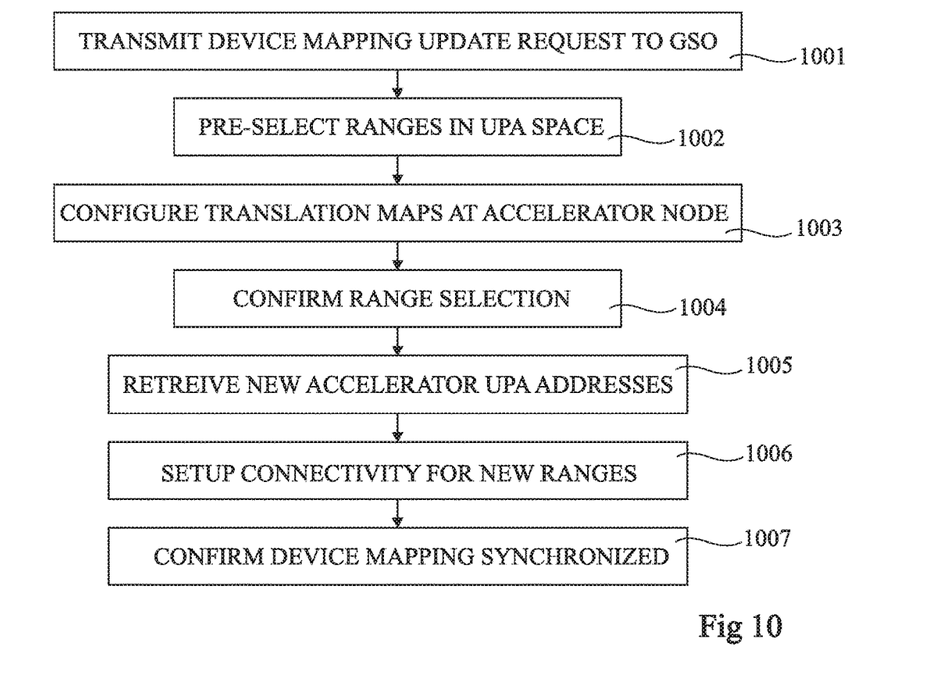
FIG. 10 is a flow diagram representing a device mapping update operation of FIG. 9 in more detail according to example embodiment of the present disclosure.

FIG. 10 is a flow diagram representing operations in a device mapping update request, and the responsive operations performed by the GSO 312, in more detail.

In an operation 1001, a device mapping update request is transmitted by the compute node 302 to the GSO 312 via the registers 602 and 612, as represented by the arrow 632 in FIG. 6. The request is for example placed in a queue of the block/module 615 corresponding to the device type before being handled by the DAT processor 616. The request is for example transmitted as a RAM_ADD request, the request including the one or more new address ranges upa_c_ram_new in the uniform physical address space, and the identifiers VM_GID, DEVICE_ID, of the guest VM and of the physical device respectively.

In an operation 1002, one or more address ranges upa_a_ram_new in the uniform physical address space are pre-selected by the DAT processor 616 using the UPA range selector 618 based on the size of the one or more new address ranges upa_c_ram_new.

In an operation 1003, the translation maps at the accelerator node 304 are configured. This for example involves transmitting a request via the translation map configuration register 614 to the translation map configuration register 608 of the accelerator node 304, as represented by the arrow 636 of FIG. 6. At the accelerator node 304, the translation map configuration module 610 sets up the translation from the host physical address space to the uniform physical address space for the one or more new ranges upa_a_ram_new. Once this is completed, an acknowledgement is sent, as represented by the arrow 640.

In an operation 1004, the pre-selected ranges are confirmed to the UPA range selector 618.

In an operation 1005, the one or more new UPA address ranges upa_m_ram new of the accelerator are retrieved by the DAT processor 616 from the data interconnect configuration engine 626.

In an operation 1006, the connectivity is set up in the interconnection network 308 to connect the one or more ranges upa_a_ram_new and upa_m_ram_new.

In an operation 1007, confirmation is sent from the GSO 312 to the compute node 302 via the registers 612 and 602 confirming that the device mapping has been synchronized, as represented by the arrow 642 in FIG. 6.

Figure 11:
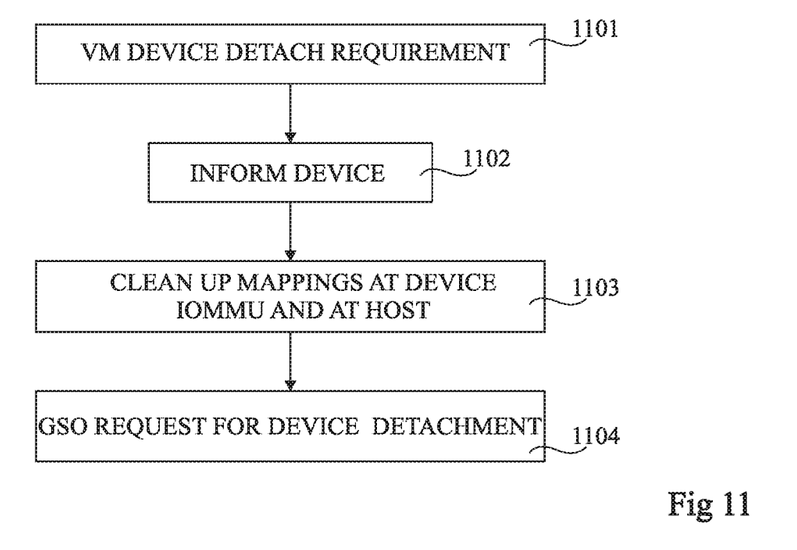
FIG. 11 is a flow diagram representing operations in a method of device detachment according to an example embodiment of the present disclosure.

FIG. 11 is a flow diagram representing operations in a method of device detachment according to example embodiment of the present disclosure.

In operation 1101, the virtual machine 404 at the compute node 302 determines that there is a device detachment requirement. For example, the VM process 502 terminates, or is killed or otherwise explicitly requests that the physical device be detached. The host pass-through driver 504 is notified in order to clean up resources associated to the virtual machine by the identifier VM_GID.

In an operation 1102, the host pass-through driver 504 uses the host physical address range hpa_c_devctl to inform the device that it is going to be detached. The physical device 402 then for example frees all internal resources reserved for the VM and stops emitting interrupts. The host pass-through driver 504 releases the associated interrupt reception slots.

In an operation 1103, the host pass-through driver 504 for example uses the address range hpa_c_iommu to clean up all mappings in the IOMMU 506 at the accelerator node 302 associated with the identifier VM_GID. In some embodiments, mapping removal can be achieved with minimal intervention by the GSO 312, thereby avoiding a potential bottleneck, for example by passing to the GSO 312 just the key values of the mappings to be cleaned up, or just the identifier VM_GID.

In an operation 1104, a request is made by the host pass-through driver 504 to the GSO 312 to perform device detachment.

Figure 12:
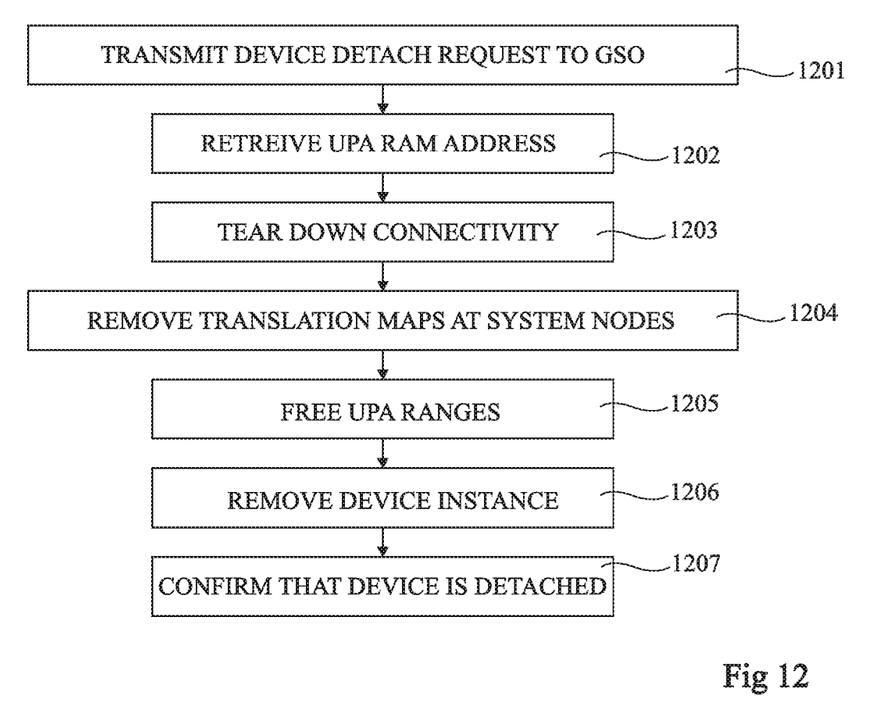
FIG. 12 is a flow diagram representing a GSO detachment operation of the method of FIG. 11 in more detail according to an example embodiment of the present disclosure.

FIG. 12 is a flow diagram representing the GSO detachment operation 1104 of the method of FIG. 11 in more detail according to an example embodiment. A similar method is for example used to remove one or more address ranges from the guest memory, which will be described in parallel.

In an operation 1201, a device detach request, or a device mapping update request in the case of a RAM resize, is transmitted by the compute node 302 to the GSO 312 via the registers 602 and 612 as represented by the arrow 632 in FIG. 6. The request is for example placed in a queue of the block/module 615 corresponding to the device type before being handled by the DAT processor 616. The request for example indicates the address ranges upa_c_devctl and upa_c_iommu to be released, or in the case of a RAM resize, the one or more ranges upa_c_ram_old to be removed, and the identifiers VM_GID of the guest VM and DEVICE_ID of the physical device.

In an operation 1202, in the case of a device detach, the DAT processor 616 uses the data interconnect configuration engine 626 to retrieve the array of address ranges upa_a_ram[ ] that is mapped to the same array of address ranges upa_m_ram[ ] as the array of address ranges upa_c_ram[ ]. In the case of a RAM resize, the DAT processor 616 uses the data interconnect configuration engine 626 to retrieve the one or more address ranges upa_m_ram_old that the one or more address ranges upa_c_ram_old were mapped to.

In an operation 1203, the connectivity is torn down by the data interconnect configuration engine 626.

In an operation 1204, the translation maps at the interconnect interfaces 310 of the system nodes are removed. In the case of a device detachment, the removal operation is performed at both the compute node 302 and the accelerator node 304, via the registers 614, 604 and 608, corresponding to the reverse operation of the configuration of these mappings. In the case of a RAM resize, only the mappings at the accelerator node 304 are removed via the registers 614 and 608.

In an operation 1205, the previously reserved ranges in the UPA address space are freed via the UPA range selector 618.

In an operation 1206, in the case of device detachment, the device selector 624 is used to unbind the instance described by the identifier DEV_ID from the VM 404 in the device database 620. This may be used to count device users, in order to, for example, power-off an unused device.

In an operation 1207, confirmation is sent from the GSO 312 to the compute node 302 via the registers 612 and 602 confirming that the device has been released in the case of device detachment, or confirming that the device mapping has been synchronized in the case of a RAM resize.

Figure 13:
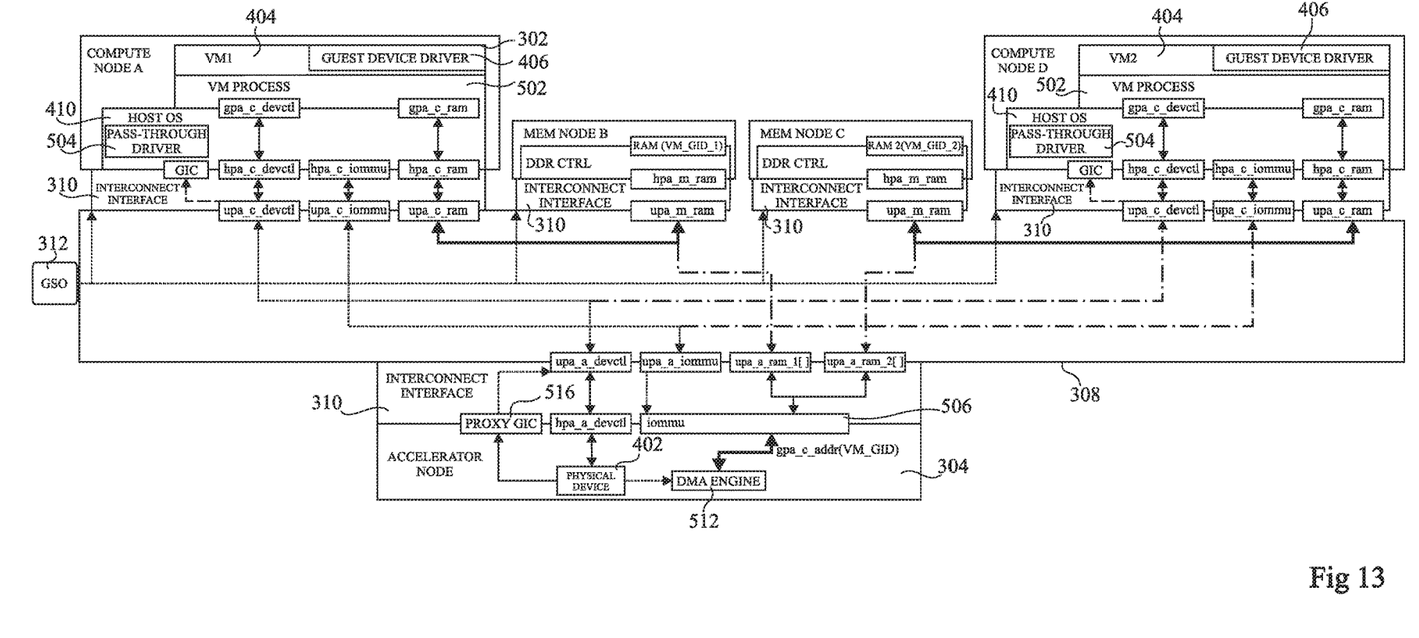
FIG. 13 schematically illustrates a disaggregated computing architecture according to a further example embodiment of the present disclosure.

FIG. 13 schematically illustrates a disaggregated computing architecture according to a further example embodiment in which there are two compute nodes A and D (COMPUTE NODE A, COMPUTE NODE D) that may share a same physical device 402 of the accelerator node 304, and two memory nodes B and C (MEM NODE B, MEM NODE C), the memory node B being used by the compute node A, and the memory node C being used by the compute node D.

Thus in the example of FIG. 13, the interconnect interface 310 of the accelerator node 304 is configured to provide mapping of the guest physical addresses gpa_c_addr to either an array of ranges upa_a_ram1[ ] for accessing the memory node B, or an array of ranges upa_a_ram2[ ] for accessing the memory node C, depending on the identifier VM_GID of the virtual machine that is using the physical device 402.

Each of the compute nodes A and D for example accesses the device address range hpa_a_devctl using the same uniform address range upa_a_devctl, and the IOMMU 506 using the same uniform address range upa_a_iommu.

Figure 14:
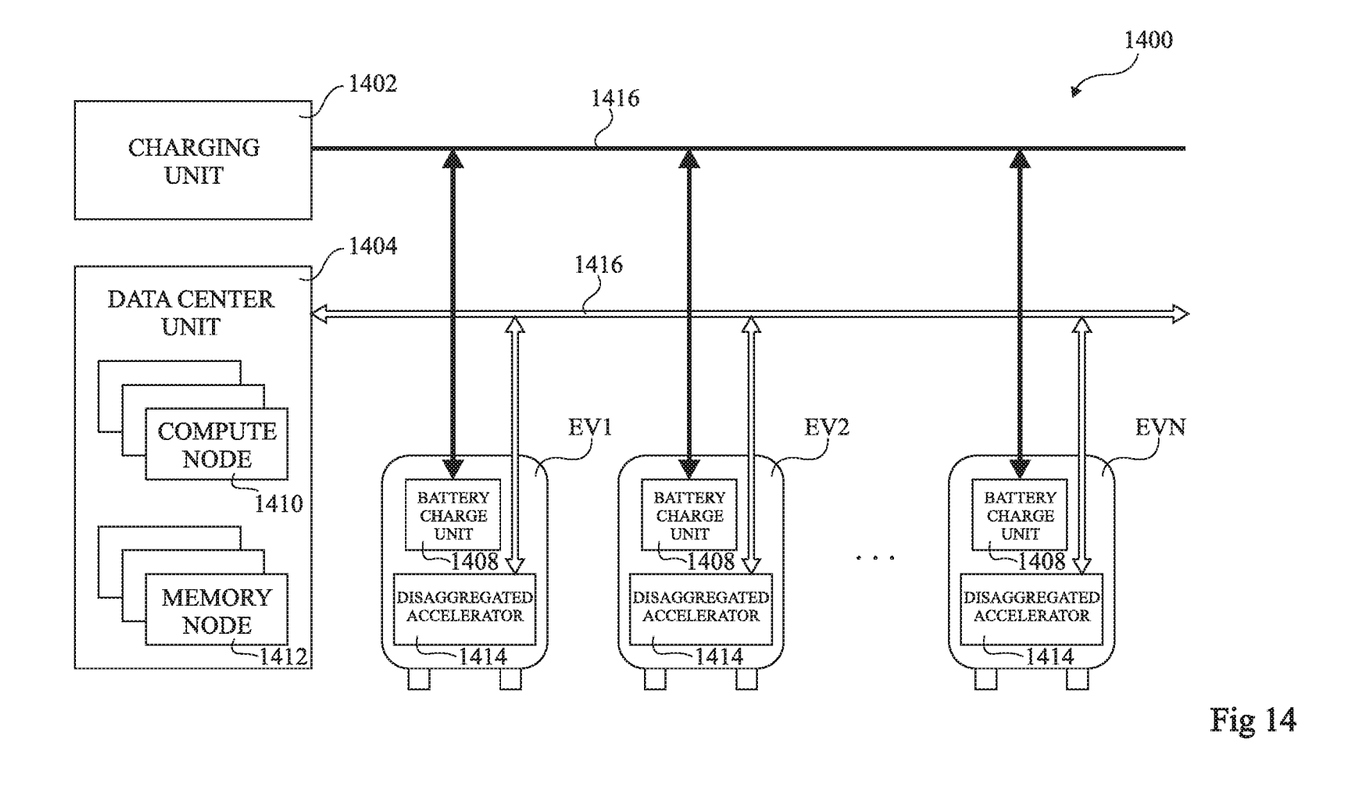
FIG. 14 schematically illustrates a pool of vehicle processors forming a disaggregated computing architecture according to an example embodiment of the present disclosure.

FIG. 14 schematically illustrates an electric vehicle charging station 1400 used to create a disaggregated computing architecture according to an example embodiment.

The charging station 1400 comprises a charging unit (CHARGING UNIT) 1402 and a data center unit (DATA CENTER UNIT) 1404.

The charging unit 1402 is coupled via one or more voltage supply buses 1406 to the electrical vehicles EV1 to EVN connected to the charging station. In particular, the voltage supply buses 1406 are connected to a battery charge unit (BATTERY CHARGE UNIT) 1408 of each electric vehicle EV1 to EVN.

The data center unit 1404 for example comprises one or more compute nodes (COMPUTE NODE) 1410, and one or more memory nodes (MEMORY NODE) 1412.

Furthermore, the data center unit 1404 is coupled to an accelerator (DISAGGREGATED ACCELERATOR) 1414 of each electric vehicle EV1 to EVN via an interconnection network 1416. The accelerator 1414 of each electric vehicle corresponds to hardware that is present in an electric vehicle and that can perform computations without the main electronic control unit (ECU—not illustrated in FIG. 14) of the vehicle being powered up, and without accessing the vehicle's internal memory, which would pose a potential security threat.

The accelerators 1414 of each electric vehicle are for example accessed by virtual machines implemented in the compute node(s) 1410 using device pass-through, and in particular based on the techniques described herein above.

Thus the charging station 1400 becomes a data center in which the computational power of the hardware present in the electrical vehicles can be rented to third party customers. Such a data center would for example be well suited to applications that tolerate variations in computation power at different times of the day, based on the number of vehicles charging at a given time.

In some embodiments, a vehicle owner may be rewarded for permitting the hardware within their vehicle to be used as a disaggregated accelerator, for example by benefiting from a lower price for charging.

An advantage of the embodiments described herein is that one or more physical devices of an accelerator node may be accessed using a device pass-through technique even though the accelerator node is part of a disaggregated computing system. This leads to both an efficient use of the computation resources in the system thanks to the disaggregated architecture, and a performance gain thanks to the use of device pass-through rather than less efficient software techniques that rely on emulation.

Various embodiments and variants have been described. Those skilled in the art will understand that certain features of these embodiments can be combined and other variants will readily occur to those skilled in the art. For example, it will be apparent to those skilled in the art that the methods described in relation to FIGS. 7 to 12 could be applied for the virtual machine VM2 of the compute node D in the embodiment of FIG. 13. Furthermore, while one example application is illustrated in FIG. 14, there are various further possible applications of the techniques described herein.

What is claimed is:

1. A disaggregated computing architecture comprising:
a first compute node comprising an interconnect interface;
an accelerator node comprising a physical device; and
an interconnection network linking the first compute node and the accelerator node, wherein:
the first compute node and the accelerator node are separate system nodes having independent physical address spaces and configured to implement a single execution environment;
the first compute node executes a host operating system and instantiates a first virtual machine executing a guest device driver for driving the physical device;
one or more input registers of the physical device are accessible via a first uniform physical address range of the interconnection network; and the interconnect interface of the first compute node is configured to map a host physical address range of the host operating system to the first uniform physical address range.

2. The disaggregated computing architecture of claim 1, further comprising a first memory node, wherein the accelerator node further comprises a memory management unit configured to map addresses in a guest physical address range of the first virtual machine to a second uniform physical address range for accessing an address range in the first memory node associated with the first virtual machine.

3. The disaggregated computing architecture of claim 2, wherein the memory management unit is configurable via a third uniform physical address range of the interconnection network.

4. The disaggregated computing architecture of claim 1, farther comprising a global system orchestrator coupled, via a further network, to the interconnect interface of the first compute node and to an interconnect interface of the accelerator node.

5. The disaggregated computing architecture of claim 1, further comprising a second compute node comprising an interconnect interface, wherein:
the second compute node executes a host operating system and instantiates a second virtual machine executing a second guest device driver for driving the physical device; and
the interconnect interface of the second compute node is configured to map a host physical address range of the host operating system of the second compute node to the first uniform physical address range.

6. The disaggregated computing architecture of claim 5, further comprising a first memory node, wherein the accelerator node further comprises a memory management unit configured to map addresses in a guest physical address range of the first virtual machine to a second uniform physical address range for accessing an address range in the first memory node associated with the first virtual machine, and further comprising a second memory node, wherein the memory management unit is further configured to map addresses in a guest physical address range of the second virtual machine to a third uniform physical address range for accessing an address range in the second memory node associated with the second virtual machine.

7. The disaggregated computing architecture of claim 1, wherein the accelerator node is a circuit of an electrical vehicle, and the first compute node is part of a data center unit of a vehicle charging station.

8. A compute node of a disaggregated computing architecture, the compute node comprising an interconnect interface, wherein:
the compute node executes a host operating system and instantiates a first virtual machine executing a guest device driver for driving a physical device of a disaggregated accelerator node, wherein the compute node and the disaggregated accelerator node are separate system nodes having independent physical address spaces and configured to implement a single execution environment;
one or more input registers of the physical device are accessible via a first uniform physical address range of an interconnection network linking the compute node and the disaggregated accelerator node; and
the interconnect interface of the compute node is configured to map a host physical address range of the host operating system to the first uniform physical address range.

9. An accelerator node of a disaggregated computing architecture, the accelerator node comprising:
a physical device;
one or more input registers of the physical device accessible via a first uniform physical address range of an interconnection network linking the accelerator node to a compute node, wherein the compute node and the accelerator node are separate system nodes having independent physical address spaces and configured to implement a single execution environment; and
a memory management unit configured to map addresses in a guest physical address range of a first virtual machine instantiated in the compute node to a second uniform physical address range for accessing an address range in a first memory node associated with the first virtual machine.

10. The accelerator node of claim 9, wherein the memory management unit is configurable via a third uniform physical address range of the interconnection network.

11. A system orchestrator for a disaggregated computing architecture, the disaggregated computing architecture comprising at least a first compute node and at least a first accelerator node interconnected by a reconfigurable interconnection network, wherein the first compute node and the first accelerator node are separate system nodes having independent physical address spaces and configured to implement a single execution environment, the system orchestrator comprising one or more circuits that are configured to:
receive a request from a first virtual machine of the first compute node for device pass-through to a physical device of the first accelerator node; and
configure interconnect interfaces of the compute node and of the accelerator node to permit translation from a first host physical address range of the first compute node to a first host physical address range of the first accelerator node.

12. The system orchestrator of claim 11, wherein the one or more circuits are configured to:
- configure the interconnect interface of the compute node to map the first host physical address range of the first compute node to a first uniform physical address range for use of the reconfigurable interconnection network; and
- configure the interconnect interface of the accelerator node to map the first uniform physical address range to the first host physical address range of the first accelerator node.

13. The system orchestrator of claim 11, wherein the one or more circuits are further configured to:
- configure a memory management unit of the accelerator node to map virtual physical addresses of the first virtual machine to uniform physical addresses for use over the reconfigurable interconnection network.

14. A method of driving a physical device of an accelerator node in a disaggregated computing architecture using device pass-through, wherein a first compute node and the accelerator node are separate system nodes having independent physical address spaces and configured to implement a single execution environment, the method comprising:

- executing, by the first compute node of the disaggregated computing architecture, a host operating system, the first compute node instantiating a first virtual machine executing a guest device driver for driving the physical device;
- accessing, by the guest device driver,
- one or more input registers of the physical device via a guest physical address range of first virtual machine;
- mapping, by a pass-through driver of the host operating system, the guest physical address range to a host physical address range of the host operating system; and
- mapping, by an interconnect interface of the first compute node, the host physical address range to a first uniform physical address range of the interconnection network for addressing the accelerator node.

15. The method of claim 6, wherein accessing the one or more input registers of the physical device comprises storing to the one or more input registers one or more pointers to an address range in a memory node associated with the first virtual machine.

* * * * *